United States Patent
Yeh et al.

(10) Patent No.: US 9,794,330 B2
(45) Date of Patent: Oct. 17, 2017

(54) SERVER, SERVER MANAGEMENT SYSTEM AND SERVER MANAGEMENT METHOD

(71) Applicant: Wistron Corporation, New Taipei (TW)

(72) Inventors: Chun-Chieh Yeh, New Taipei (TW); Ming-Sheng Wu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 175 days.

(21) Appl. No.: 14/561,354

(22) Filed: Dec. 5, 2014

(65) Prior Publication Data

US 2015/0381769 A1    Dec. 31, 2015

(30) Foreign Application Priority Data

Jun. 25, 2014   (TW) .............................. 103121906 A

(51) Int. Cl.
  *G06F 15/173*    (2006.01)
  *H04L 29/08*    (2006.01)
(52) U.S. Cl.
  CPC .................................. *H04L 67/10* (2013.01)
(58) Field of Classification Search
  CPC ......... H04L 67/10; G06F 11/00; G06F 9/5077
  USPC ....................................................... 709/223
  See application file for complete search history.

(56) References Cited

U.S. PATENT DOCUMENTS

| | | | |
|---|---|---|---|
| 2004/0162945 A1* | 8/2004 | King | G06F 11/006 711/122 |
| 2004/0221084 A1 | 11/2004 | Yates et al. | |
| 2012/0254662 A1* | 10/2012 | Chen | H04L 43/50 714/32 |
| 2013/0238785 A1* | 9/2013 | Hawk | G06F 9/5072 709/224 |
| 2013/0254361 A1* | 9/2013 | Liu | H04L 61/609 709/223 |
| 2014/0032641 A1* | 1/2014 | Du | H04L 43/065 709/203 |
| 2014/0280947 A1* | 9/2014 | Christopher | H04L 41/08 709/226 |
| 2015/0026526 A1* | 1/2015 | Mondal | G06F 11/2236 714/43 |

(Continued)

OTHER PUBLICATIONS

"Platform Management FRU Information Storage Definition"; Document Revision 1.1; Sep. 27, 1999; pp. 1-26.

(Continued)

*Primary Examiner* — Kevin Bates
*Assistant Examiner* — Ronak Patel
(74) *Attorney, Agent, or Firm* — McClure, Qualey & Rodack, LLP

(57) ABSTRACT

A server, a server management system and a server management method are disclosed. The server comprises a field replaceable unit (FRU) memory and a baseboard management controller (BMC). The FRU memory stores an FRU data. The BMC receives an FRU access command from a remote management computer via an intelligent platform management interface (IPMI). The FRU access command comprises an FRU identification (ID). The BMC determines whether the FRU ID belongs to the FRU memory. If the FRU ID does not belong to the FRU memory, the BMC accesses a custom file according to the FRU ID. The custom file is different from the FRU data.

17 Claims, 2 Drawing Sheets

(56) References Cited

U.S. PATENT DOCUMENTS

| | | | | |
|---|---|---|---|---|
| 2015/0046761 A1* | 2/2015 | Messer | ............. | G06F 11/00 |
| | | | | 714/710 |
| 2015/0100298 A1* | 4/2015 | Abraham | ............. | G06F 11/00 |
| | | | | 703/22 |
| 2015/0256386 A1* | 9/2015 | Palmer | ............. | F24F 11/006 |
| | | | | 709/220 |

OTHER PUBLICATIONS

"34 FRU Inventory Device Commands"; "34.1 Get FRU Inventory Area Info Command" ; Intelligent Platform Management Interface Specification; pp. 413; 2004.

"34.2 Read FRU Data Command"; "34.3 Write FRU Data Command"; Intelligent Platform Management Interface Specification; pp. 413; 2004.

"Platform Management FRU Information Storage Definition v1.0"; Document Revision 1.2 Feb. 28, 2013; Platform Management FRU Information Storage Definition; pp. 1-29.

TIPO Office Action dated Mar. 18, 2016 in corresponding Taiwan application (No. 103121906).

Platform Management, Universal Developer's Guide: Dec. 2000; RadiSys. Corporation; pp. 1-19.

* cited by examiner

SERVER, SERVER MANAGEMENT SYSTEM AND SERVER MANAGEMENT METHOD

This application claims the benefit of Taiwan application Serial No. 103121906, filed Jun. 25, 2014, the subject matter of which is incorporated herein by reference.

BACKGROUND OF THE DISCLOSURE

Field of the Disclosure

The invention relates in general to an electronic device, and more particularly to a server, a server management system and a server management method.

Description of the Related Art

A server administrator normally manages more than one server. It would be a tremendous burden to the server administrator if he/she has to visit each server in person. Based on current technologies, the server administrator can manage several servers by operating a remote management computer which communicates with servers via an intelligent platform management interface (IPMI).

Since the IPMI still does not have any standard specifications for transmitting the custom file defined by the user, the OEM tools developed by different manufacturers are incompatible with each other. However, if a user would like to use a remote management computer to manage the servers manufactured by different manufacturers, the user need to use the OEM tools developed by different manufacturers for transmitting files between the servers manufactured by different manufacturers.

SUMMARY OF THE DISCLOSURE

The invention is directed to a server, a server management system and a server management method.

According to one embodiment of the present invention, a server management method is disclosed. The server management method comprises following steps. A field replaceable unit (FRU) access command is sent to a baseboard management controller (BMC) by a remote management computer via an intelligent platform management interface (IPMI), wherein the FRU access command comprises an FRU identification (ID). Whether the FRU ID belongs to the FRU memory is determined, wherein the FRU memory stores an FRU data. A custom file is accessed by the BMC according to the FRU ID if the FRU ID does not belong to the FRU memory.

According to another embodiment of the present invention, a server is disclosed. The server comprises a field replaceable unit (FRU) memory and a baseboard management controller (BMC). The FRU memory stores an FRU data. The BMC receives an FRU access command from a remote management computer via an intelligent platform management interface (IPMI). The FRU access command comprises an FRU identification (ID). The BMC determines whether the FRU ID belongs to the FRU memory. If the FRU ID does not belong to the FRU memory, the BMC accesses a custom file according to the FRU ID. The custom file is different from the FRU data.

According to an alternate embodiment of the present invention, a server management system is disclosed. The server management system comprises a remote management computer, an intelligent platform management interface (IPMI) and a server. The server comprises a field replaceable unit (FRU) memory and a baseboard management controller (BMC). The FRU memory stores an FRU data. The BMC receives an FRU access command from a remote management computer via an intelligent platform management interface (IPMI). The FRU access command comprises an FRU ID. The BMC determines whether the FRU ID belongs to the FRU memory. If the FRU ID does not belong to the FRU memory, the BMC accesses a custom file according to the FRU ID. The custom file is different from the FRU data.

The above and other aspects of the disclosure will become better understood with regard to the following detailed description of the preferred but non-limiting embodiment (s). The following description is made with reference to the accompanying drawings.

DETAILED DESCRIPTION OF THE DISCLOSURE

Figure 1:
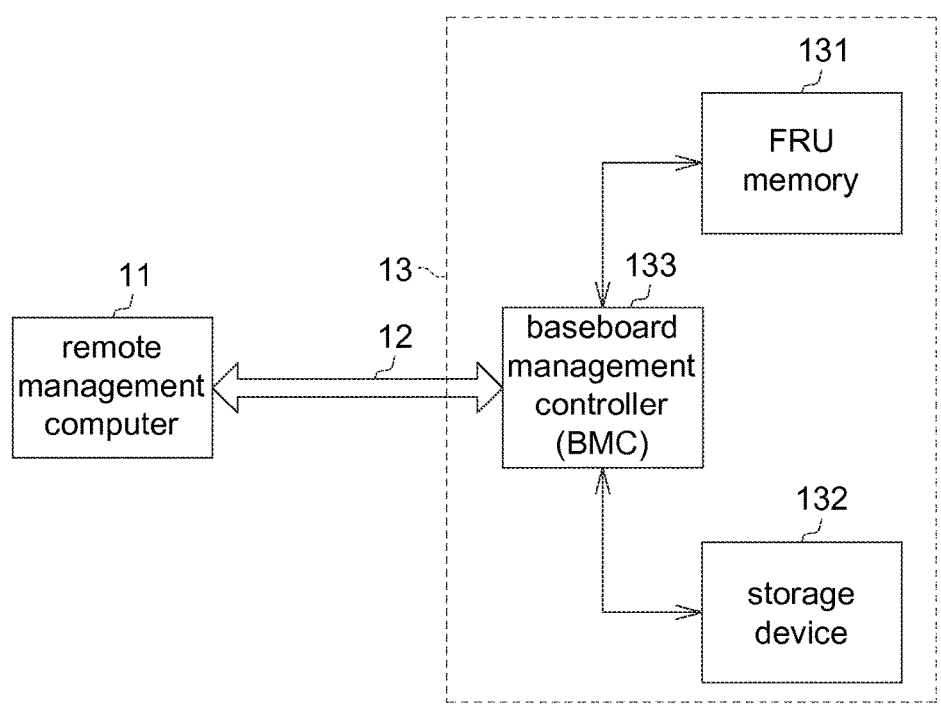
FIG. 1 is a schematic diagram of a server management system.

Referring to FIG. 1, a schematic diagram of a server management system is shown. The server management system 1 comprises a remote management computer 11, an intelligent platform management interface (IPMI) 12 and a server 13. The server 13 comprises a field replaceable unit (FRU) memory 131, a storage device 132 and a baseboard management controller (BMC) 133. The FRU memory 131 for example is an electrically erasable programmable read-only memory (EEPROM). The FRU memory 131 stores an FRU data, such as a manufacturer, a serial number, a part number, an asset tag or a short descriptive string of the FRU. The storage device 132 stores a custom file which is different from the FRU data. The custom file for example is a BIOS bin file, a CPLD bin file, fan table bin file, meta data or other files to be uploaded/downloaded by the remote management computer 11.

The remote management computer 11 can send a get FRU inventory area info command to the BMC 133 by using a remote control management tool IPMI tool. Detailed descriptions of the get FRU inventory area info command are disclosed in IPMI V2.0. The get FRU inventory area info command comprises an FRU identification (ID). The BMC 133 responds to the size of an FRU inventory area according to the FRU ID. For example, the FRU ID of the FRU memory 131 is 01, and the size of the FRU inventory area of the FRU memory 131 is 1K. When the FRU ID of the get FRU inventory area info command is 01, the BMC 133 sends 1K to the remote management computer 11.

The BMC 133 receives an FRU access command from the remote management computer 11 via the intelligent platform management interface (IPMI) 12. The FRU access command for example is a write FRU data or a read FRU data command. Detailed descriptions of the write FRU data and the read FRU data command are disclosed in IPMI V2.0. The FRU access command comprises an FRU identification (ID). When the FRU ID of the FRU access command is 01, the BMC 133 accesses the FRU data according to the FRU ID 01 and the FRU memory 131.

Apart from the FRU data that can also be transmitted between the BMC 133 and the remote management computer 11, a custom file can also be transmitted between the BMC 133 and the remote management computer 11. To transmit a custom file between the remote management computer 11 and the BMC 133, the remote management computer 11 sends a get FRU inventory area info command to the BMC 133 by using a remote control management tool IPMI tool.

The BMC 133 responds to the size of an FRU inventory area according to the FRU ID. For example, the FRU ID of the storage device 132 is 10, and the FRU ID 10 does not belong to the FRU memory 131. If the custom file is 64K, then the BMC 133 sends the size of the FRU inventory area being 64K to the remote management computer 11 when the FRU ID of the get FRU inventory area info command is 10. Meanwhile, it can be regarded as the BMC 133 creating a dummy specific FRU inventory area, and further sending this specific FRU inventory area to the remote management computer 11. The remote control management tool IPMI tool executed by the remote management computer 11 will regard this specific FRU inventory area as really existing.

The BMC 133 receives an FRU access command from the remote management computer 11 via the IPMI 12. When the FRU ID of the FRU access command is 10, the BMC 133 accesses a custom file according to the FRU ID 10 and the storage device 132.

It should be noted that the FRU access command may further comprise an offset value, and the BMC 133 accesses a custom file according to the FRU ID and the offset value. If the custom file cannot be completely accessed in the first time of accessing, the remote control management tool IPMI tool executed by the remote management computer 11 will call the FRU access command for several times. When the FRU access command is executed again, a part of data of the custom file is accessed according to the offset value.

Figure 2:
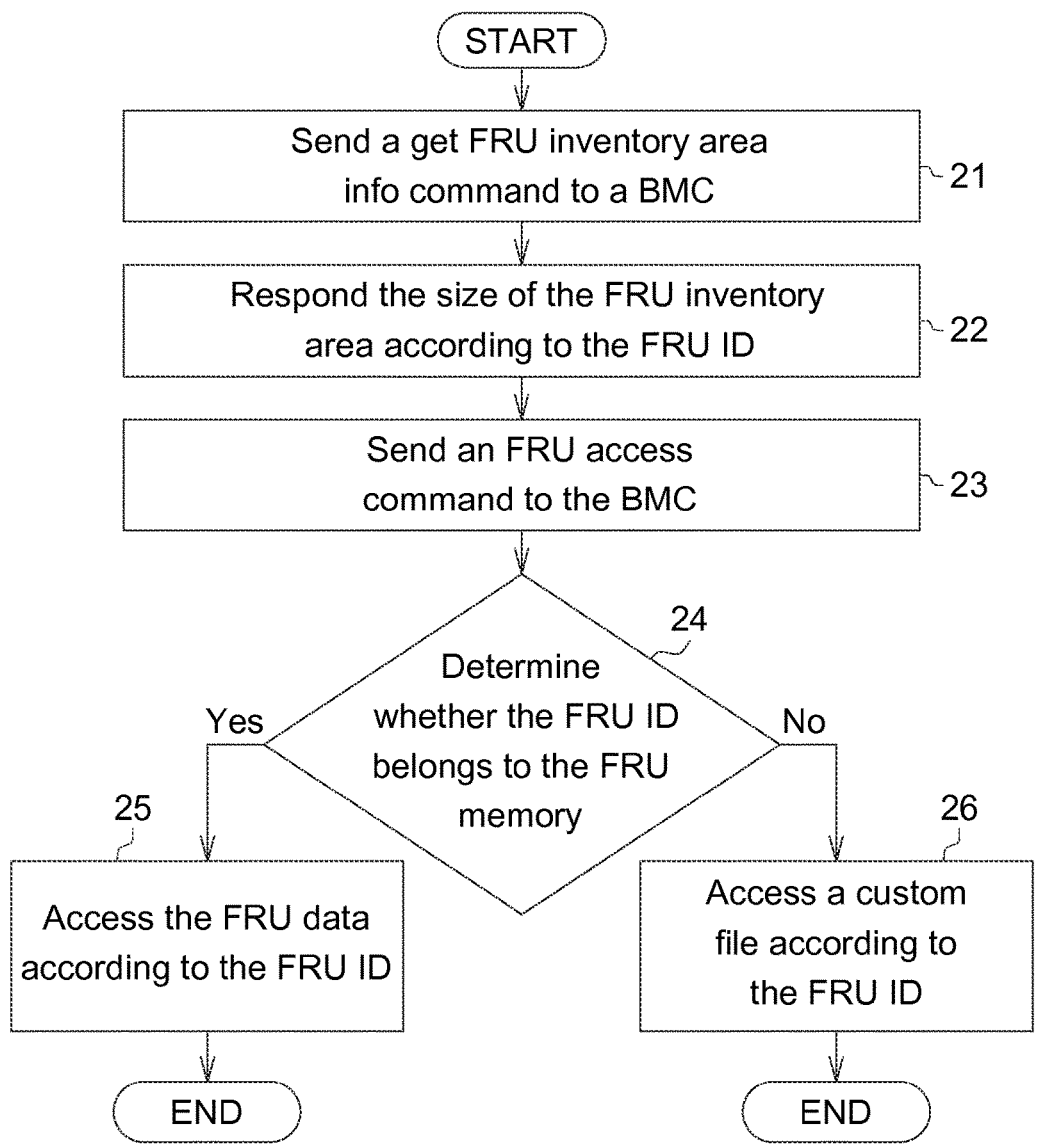
FIG. 2 is a flowchart of a server management method.

Refer to FIG. 1 and FIG. 2 collectively. FIG. 2 is a flowchart of a server management method. The server management method can be used in the server management system 1, and comprises following steps. Firstly, the method begins at step 21, a get FRU inventory area info command is sent to the BMC 133 by the remote management computer 11 via the IPMI 12. Next, the method proceeds to step 22, the size of the FRU inventory area is responded by the BMC 133 according to the FRU ID of the get FRU inventory area info command. The size of the FRU inventory area is such as the capacity of the FRU memory 131 or the size of the custom file.

Then, the method proceeds to step 23, an FRU access command is sent to the BMC 133 by the remote management computer 11 via the IPMI 12. Then, the method proceeds to step 24, whether the FRU ID of the FRU access command belongs to the FRU memory 131 is determined by the BMC 133. If the FRU ID belongs to the FRU memory 131, the method proceeds to step 25. In step 25, the FRU data is accessed by the BMC 133 according to the FRU ID. Conversely, if the FRU ID does not belong to the FRU memory 131, the method proceeds to step 26. In step 26, a custom file is accessed by the BMC 133 according to the FRU ID.

According to the server, the server management system and the server management method disclosed in above embodiments, the transmission of custom files can be dispensed with the development of additional OEM tools. For the users, the dispensation of developing OEM tools means simplification in management, increase in compatibility of server, and decrease in the likelihood of virus infection.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A server management method, comprising:
   sending a get field replaceable unit (FRU) inventory area info command to a baseboard management controller (BMC) by a remote management computer via an intelligent platform management interface (IPMI), wherein the get FRU inventory area info command comprises an FRU identification (ID); and
   responding to a size of an FRU inventory area according to the FRU ID, wherein when the FRU ID does not belong to an FRU memory, a dummy-specific FRU inventory area is created, and the size of the specific FRU inventory area is sent to the remote management computer;
   sending a field replaceable unit (FRU) access command to the baseboard management controller (BMC) by the remote management computer via the intelligent platform management interface (IPMI), wherein the FRU access command comprises the FRU identification (ID);
   determining whether the FRU ID belongs to the FRU memory, wherein the FRU memory stores an FRU data; and
   accessing a custom file by the baseboard management controller (BMC) according to the FRU ID if the FRU ID does not belong to the FRU memory, wherein the custom file is different from the FRU data.

2. The server management method according to claim 1, wherein the BMC accesses the FRU data according to the FRU ID if the FRU ID belongs to the FRU memory.

3. The server management method according to claim 2, wherein the FRU access command is a write FRU data or a read FRU data command.

4. The server management method according to claim 3, wherein the FRU access command further comprises an offset value, and the BMC accesses a custom file according to the FRU ID and the offset value.

5. The server management method according to claim 1, wherein the FRU memory is an electrically erasable programmable read-only memory (EEPROM).

6. A server, comprising:
   a field replaceable unit (FRU) memory for storing an FRU data; and
   a baseboard management controller (BMC) for receiving a get FRU inventory area info command from a remote management computer via an intelligent platform management interface (IPMI), responding to a size of an FRU inventory area according to an FRU identification (ID) included in the get FRU inventory area info command, and receiving an FRU access command from the remote management computer via the intelligent platform management interface (IPMI), wherein the FRU access command comprises the FRU ID, the BMC creates a dummy-specific FRU inventory area and sends the size of the specific FRU inventory area to the remote management computer when the FRU ID does not belong to the FRU memory, determines whether the FRU ID belongs to the FRU memory, and accesses a custom file according to the FRU ID if the FRU ID does not belong to the FRU memory, and the custom file is different from the FRU data.

7. The server according to claim 6, wherein the BMC accesses the FRU data according to the FRU ID if the FRU ID belongs to the FRU memory.

8. The server according to claim 7, wherein the FRU access command is a write FRU data or a read FRU data command.

9. The server according to claim 8, wherein the FRU access command further comprises an offset value, and the BMC accesses a custom file according to the FRU ID and the offset value.

10. The server according to claim 6, wherein the FRU memory is an electrically erasable programmable read-only memory (EEPROM).

11. The server according to claim 6, further comprising: a storage device for storing the custom file.

12. A server management system, comprising:
a remote management computer;
an intelligent platform management interface (IPMI); and
a server, comprising:
a field replaceable unit (FRU) memory for storing an FRU data; and
a baseboard management controller (BMC) for receiving a get FRU inventory area info command from a remote management computer via the IPMI, responding to a size of an FRU inventory area according to an FRU ID included in the get FRU inventory area info command, and receiving an FRU access command from the remote management computer via the IPMI, wherein the FRU access command comprises the FRU ID, the BMC creates a dummy-specific FRU inventory area and sends the size of the specific FRU inventory area to the remote management computer when the FRU ID does not belong to the FRU memory, determines whether the FRU ID belongs to the FRU memory, and accesses a custom file according to the FRU ID if the FRU ID does not belong to the FRU memory, and the custom file is different from the FRU data.

13. The server management system according to claim 12, wherein the BMC accesses the FRU data according to the FRU ID if the FRU ID belongs to the FRU memory.

14. The server management system according to claim 13, wherein the FRU access command is a write FRU data or a read FRU data command.

15. The server management system according to claim 14, wherein the FRU access command further comprises an offset value, and the BMC accesses a custom file according to the FRU ID and the offset value.

16. The server management system according to claim 12, wherein the FRU memory is an electrically erasable programmable read-only memory (EEPROM).

17. The server management system according to claim 12, wherein the server further comprises:
a storage device for storing the custom file.

* * * * *